United States Patent
Nishioka et al.

[11] Patent Number: 5,150,398
[45] Date of Patent: Sep. 22, 1992

[54] BEARING AND ROTARY ANODE X-RAY TUBE EMPLOYING THE BEARING

[75] Inventors: Takeshi Nishioka; Tsutomu Shikanai, both of Yokohama; Hitoshi Marumo, Kamakura, all of Japan

[73] Assignee: Kabushiki Kaisha Toshiba, Kawasaki, Japan

[21] Appl. No.: 375,963

[22] Filed: Jul. 6, 1989

[30] Foreign Application Priority Data

Jul. 6, 1988 [JP] Japan .................. 63-166858
May 16, 1989 [JP] Japan .................. 1-120305

[51] Int. Cl.$^5$ ............................... H01J 35/10
[52] U.S. Cl. ................... 378/132; 378/133; 384/492
[58] Field of Search ............... 378/132, 133; 384/907.1, 492, 912, 913

[56] References Cited

U.S. PATENT DOCUMENTS

| | | | |
|---|---|---|---|
| 2,570,770 | 10/1951 | Combee | 378/133 |
| 2,754,168 | 7/1956 | Atlee | 378/133 |
| 3,929,396 | 12/1975 | Orkin et al. | 384/907.1 |
| 4,326,144 | 4/1982 | Appelt | 378/132 |
| 4,357,555 | 11/1982 | Gerkema et al. | 378/135 |
| 4,641,332 | 2/1987 | Gerkema | 378/132 |
| 4,956,858 | 9/1990 | Upadhya | 378/132 |

FOREIGN PATENT DOCUMENTS

| | | | |
|---|---|---|---|
| 55-133739 | 10/1980 | Japan . | |
| 0194335 | 11/1984 | Japan | 378/133 |
| 59-215646 | 12/1984 | Japan . | |
| 0211750 | 10/1985 | Japan | 378/133 |

OTHER PUBLICATIONS

Atlee et al., "Lubrication in Vacuum by Vaporized Thin Metallic Films", *Journal of Applied Physics*, vol. 11, No. 9, 611-615, 1940.

Primary Examiner—David P. Porta
Attorney, Agent, or Firm—Foley & Lardner

[57] ABSTRACT

A rotary anode X-ray tube comprises a cathode for emitting electrons in a vacuum vessel, an anode target with which the electrons emitted from the cathode collide to generate X-rays, a rotor fixed integrally with the anode target, and a plurality of bearings for rotatably supporting the anode target. Frictional surfaces of at least one of the bearings that is located in the vicinity of the anode target are coated with lubricant that demonstrates low vapor pressure at high temperatures. Main component of the lubricant is one of tin, aluminum and indium. Mother material of at least one of the bearings is ceramics.

42 Claims, 6 Drawing Sheets

BEARING AND ROTARY ANODE X-RAY TUBE EMPLOYING THE BEARING

BACKGROUND OF THE INVENTION

1. Field of the Invention

The present invention relates to a bearing and a rotary anode X-ray tube employing the bearing, and particularly to a bearing that can maintain a stable lubrication state under the conditions of high temperature and vacuum.

2. Description of the Prior Art

FIG. 1 is a sectional view showing a conventional ball bearing 3. The ball bearing 3 is disposed between a bearing fitting face 1 and a rotary shaft 2. The ball bearing 3 comprises an inner race 4, an outer race 5 and a plurality of balls 6 rotatably arranged between the inner and outer races 4 and 5. Frictional surfaces of the inner and outer races 4 and 5 and balls 6 are coated with a proper lubricant (not shown).

When an apparatus employing such a ball bearing 3 is used under the conditions of high temperature and vacuum, the ball bearing 3 is heated to a high temperature. To realize good lubrication under such conditions, lead (Pb) and silver (Ag) are conventionally used as the lubricant.

If lead is used as the lubricant on the frictional surfaces of the ball bearing 3, an evaporating rate of the lead increases as the temperature of the ball bearing 3 increases. As a result, a high vacuum may not be maintained with the lead. If silver is used as the lubricant, frictional conditions of the ball bearing 3 become more severe when the ball bearing 3 is rotated at high speed at high temperatures, because the silver is hard. As a result, stable lubrications may not be maintained and a service life of the ball bearing 3 may be shortened with the silver.

FIG. 2 is a sectional view schematically showing a rotary anode X-ray tube according to the prior art. A vacuum vessel 10 contains a cathode 11 for emitting electrons, a rotary shaft 12, a rotor 13 fixed to the rotary shaft 12, and an anode target 14 fixed to the rotor 13. The cathode 11 and anode target 14 face each other. The rotary shaft 12 is rotatably supported by a support shaft 16 through two ball bearings 15a and 15b. Each of the ball bearings 15a and 15b comprises an inner race 17, an outer race 18, and a plurality of balls 19 rotatably arranged between the inner and outer races 17 and 18. A magnetic field generator (not shown) is disposed outside the vacuum vessel 10 to generate a rotating magnetic field that rotates the rotary shaft 12 together with the rotor 13, thus rotating the anode target 14.

When electrons emitted from the cathode 11 of the rotary anode X-ray tube hit the anode target 14, X-rays are generated to heat the anode target 14 and the inside of the vacuum vessel 10. When the anode target 14 and vacuum vessel 10 are heated to high temperatures, the ball bearings 15a and 15b are also heated due to heat radiation and heat conduction from the rotary shaft 12. To prevent the ball bearings 15a and 15b from seizure and wearing due to the heat, the frictional surfaces of the inner and outer races 17 and 18 and balls 19 of the ball bearings 15a and 15b are coated with the lubricant. Since the bearings are used under the conditions of high temperature and vacuum, oil lubrication is not possible to take place. Therefore, a solid lubricant such as lead and silver is used as mentioned in the above.

To increase an output of the rotary anode X-ray tube, electrons hitting the anode target 14 shall be increased. Then, the anode target 14 is further heated to increase the temperatures of the ball bearings 15a and 15b. To prevent the anode target 14 from locally heating and melting due to the colliding electrons, the anode target 14 shall be rotated at high speed.

If the temperature of the anode target 14 increases due to the increased output, an evaporating rate of lead, if the lead is used as the lubricant of the frictional surfaces of the ball bearings 15a and 15b, increases so that a high vacuum may not be maintained. Namely, if the lead is used as the lubricant, it may be usable up to about 300 degrees centigrade but it may not be usable if the temperature increases to about 400 degrees centigrade, because the vapor pressure of lead is high.

On the other hand, if the silver is used as the lubricant, friction of the ball bearings 15a and 15b may increase because the silver is hard, so that stable lubrication may not be maintained, and service lives of the bearings shortened.

As described in the above, the conventional bearings use lead and silver as a lubricant for frictional surfaces that are subjected to high temperatures and vacuum. Since the lead and silver lower the degree of vacuum or enlarge friction, stable lubrication is not maintained. In addition, the rotary anode X-ray tube employing lead or silver as lubricant for frictional surfaces of its bearings may cause a decrease in the vacuum degree or an increase in friction if a temperature increases, to deteriorate lubrication of the bearings.

SUMMARY OF THE INVENTION

To solve the problems, an object of the present invention is to provide a bearing that can maintain stable lubrication under the conditions of high temperature and vacuum, and a rotary anode X-ray tube that can maintain stable lubrication even with an increased output.

In order to accomplish the object, the present invention provides a bearing coated with a lubricant that achieves low vapor pressure at high temperatures.

The present invention also provides a rotary anode X-ray tube comprising a cathode for emitting electrons in a vacuum vessel, an anode target with which the electrons emitted from the cathode collide to generate X-rays, a rotor fixed integrally with the anode target, and a plurality of bearings for rotatably supporting the anode target. Frictional surfaces of at least one of the bearings that is located in the vicinity of the anode target are coated with a lubricant that demonstrates low vapor pressure at high temperatures. The frictional surfaces of the bearings may be coated with a lubricant whose main component is at least one of tin, aluminum and indium. Mother material of at least one of the bearings may be ceramics.

As described in the above, the frictional surfaces of the bearings of the invention employed for the rotary anode X-ray tube are coated with a lubricant that achieves low vapor pressure at high temperatures. The lubricant may be tin (Sn), aluminum (Al) or indium (In). As shown in FIG. 3, these materials demonstrate low vapor pressure compared to lead (Pb) that is conventionally used as a lubricant, so that they can maintain stable lubrication even at high temperatures exceeding 350 degrees centigrade and in vacuum without deteriorating the degree of vacuum.

Since the tin (Sn) and indium (In) have lower melting points than the lead (Pb), they are easily liquidized according to an increase of temperature to reduce friction under the conditions of high temperature and vacuum and maintain stable lubrication.

Although the aluminum (Al) has a relatively high melting point and is hardly liquidized, it is sufficiently soft compared to silver (Ag) that is also conventionally used a lubricant. Therefore, the lubrication capacity of aluminum is satisfactory. The same actions and effects are obtainable by alloys whose main components are at least one of the tin, aluminum and indium.

These and other objects, features and advantages of the present invention will be more apparent from the following detailed description of preferred embodiments in conjunction with the accompanying drawings.

DETAILED DESCRIPTION OF THE EMBODIMENTS

Embodiments of the present invention will be explained with reference to the drawings in which the same parts as those of the prior art are represented with the same reference marks.

Figure 4:
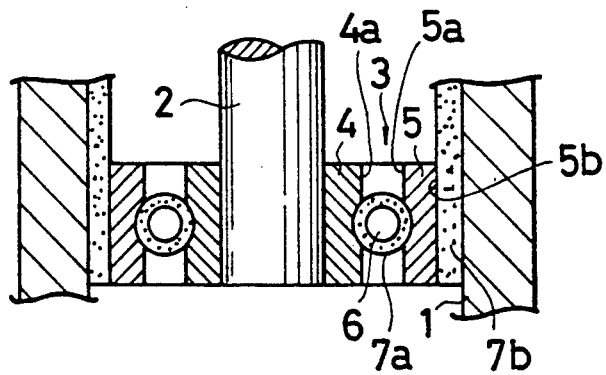
FIG. 4 is a sectional view showing a bearing according to the present invention.

FIG. 4 is a sectional view showing a ball bearing according to the present invention. In the figure, a ball bearing 3 comprises an inner race 4, an outer race 5 and a plurality of balls 6 rotatably arranged between the inner and outer races 4 and 5. The bearing 3 is disposed between a bearing fitting face 1 and a rotary shaft 2. The inner and outer races 4 an 5 and balls 6 are made of silicon nitride. The surface of each ball 6 is coated with a tin film 7a as lubricant between frictional surfaces of the inner and outer races 4 and 5 and balls 6. Also, the bearing fitting face 1 is coated with a tin film 7b as a lubricant with respect to the outer race 5.

Figure 3:
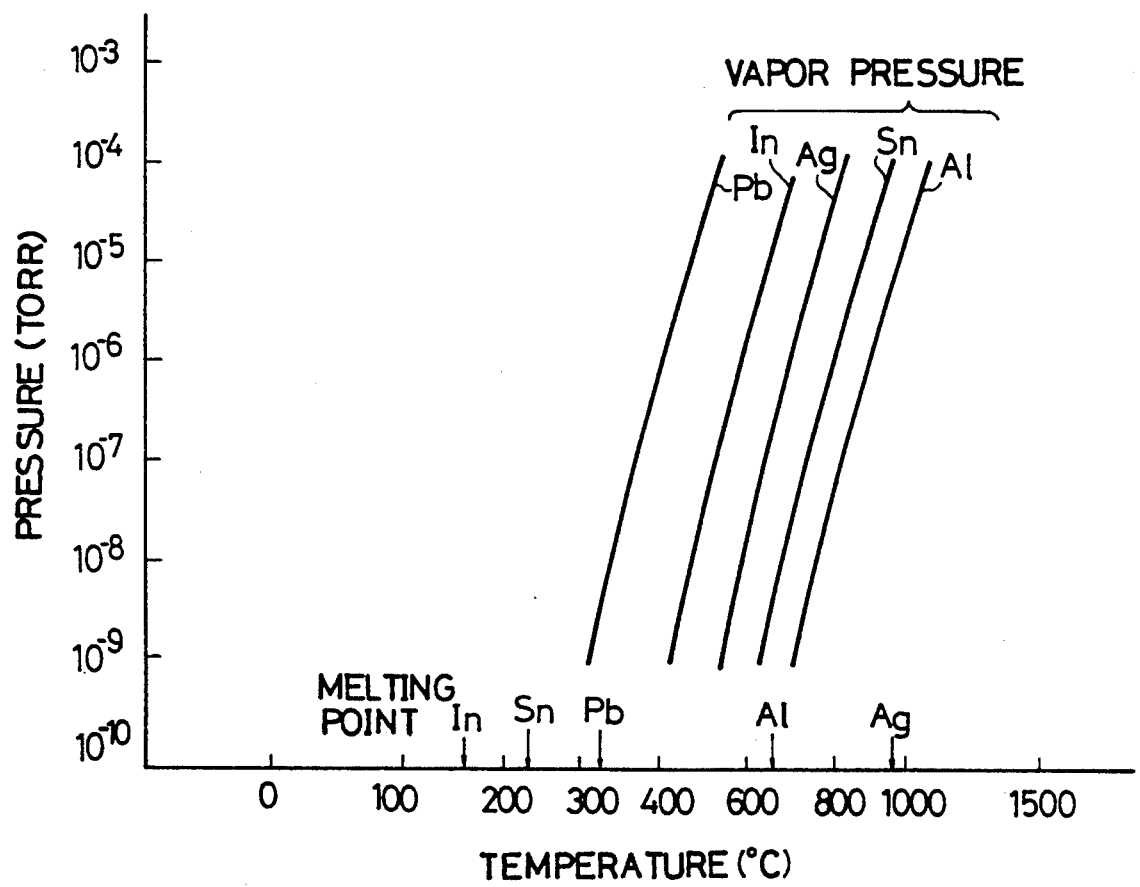
FIG. 3 is a view showing the melting points and vapor pressures of tin, aluminum, indium, platinum, lead and silver.

The tin films 7a and 7b covering the surfaces of the balls 6 and bearing fitting face 1 are made of soft metal so that they have lubrication capacities at solid and liquid states. As shown in FIG. 3, the tin has a low melting point and a low vapor pressure so that it may be in a molten state under the conditions of high temperature and vacuum without deteriorating the degree of vacuum due to evaporation. The tin can maintain stable lubrication even if the bearing rotates at high speed.

Although the surfaces of the balls 6 and bearing fitting face 1 have been coated with the tin films 7a and 7b in the embodiment, an outer face 4a of the inner race 4 and an inner face 5a of the outer race 5 may be coated with the tin, or an outer face 5b of the outer race 5 may be coated with the tin. It is possible to coat only the balls 6 with the tin.

The present invention is applicable not only for the bearings without retainers but also for bearings with retainers, roller bearings and slide bearings to coat their frictional surfaces with the tin to maintain stable lubrication under the conditions of high temperature and vacuum.

Even if the tin film 7a covering the surface of each ball 6 is liquidized due to high temperatures, the frictional surfaces of the inner and outer races 4 and 5 and balls 6 will not be damaged due to corrosion because the inner and outer races 4 and 5 and balls 6 are made of silicon nitride.

In the above embodiment, the surfaces of the balls 6 and bearing fitting face 1 are covered with the tin films 7a and 7b. It is also possible to coat the surfaces of the balls 6 and bearing fitting face 1 with any one of aluminum and indium. Similar to the tin, the aluminum and indium demonstrate low vapor pressure as shown in FIG. 3 compared to lead that is conventionally used as lubricant for bearings. Therefore, the aluminum and indium do not lower the degree of vacuum at high temperatures due to evaporation, and they can maintain good lubrication even if the bearings are rotated at high speed.

As shown in Table 1 (showing measurement values at a room temperature), the aluminum (Al) is a relatively soft metal that has small tensile strength and large elongation compared to the silver (Ag) that is conventionally used as lubricant for bearings. Therefore, the aluminum does not deteriorate the degree of vacuum at high temperatures. In addition, the aluminum is hardly liquidized. Even at a solid state, the aluminum demonstrates good lubrication and can maintain the lubrication of low friction.

According to various experiments carried out by the inventors, tensile strength and lubricating capacity are closely related to each other, i.e., smaller the tensile strength, the better the lubricating capacity. This may be understood from the fact that the lead (Pb) has small tensile strength to demonstrate good lubrication while the silver (Ag) has large tensile strength to demonstrate inferior lubrication, as shown in Table 1.

Although the inner and outer races 4 and 5 and balls 6 of the ball bearing 3 have been made of silicon nitride in the embodiment, they may be made of any one of silicon carbide, alumina and zirconia. These materials have excellent corrosion resistance so that they may particularly effective if they are combined with the tin (Sn) and indium (In) that are used under molten states.

TABLE 1

| Metal | Tensile strength (Kg/mm$^2$) | Elongation (%) |
|---|---|---|
| Al | 4.76 | 60 |
| Ag | 12.7 | 48 |
| Pb | 1.8 | 40 |

Figure 1:
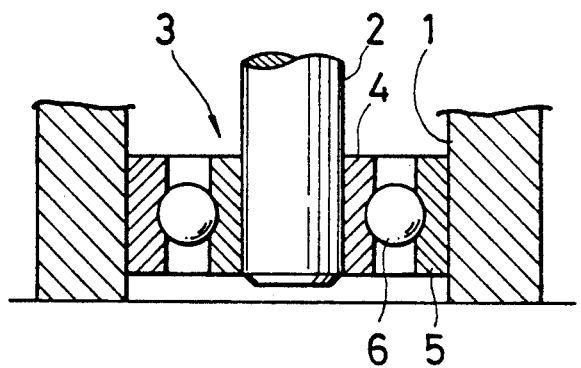
FIG. 1 is sectional view showing a conventional bearings.
Figure 2:
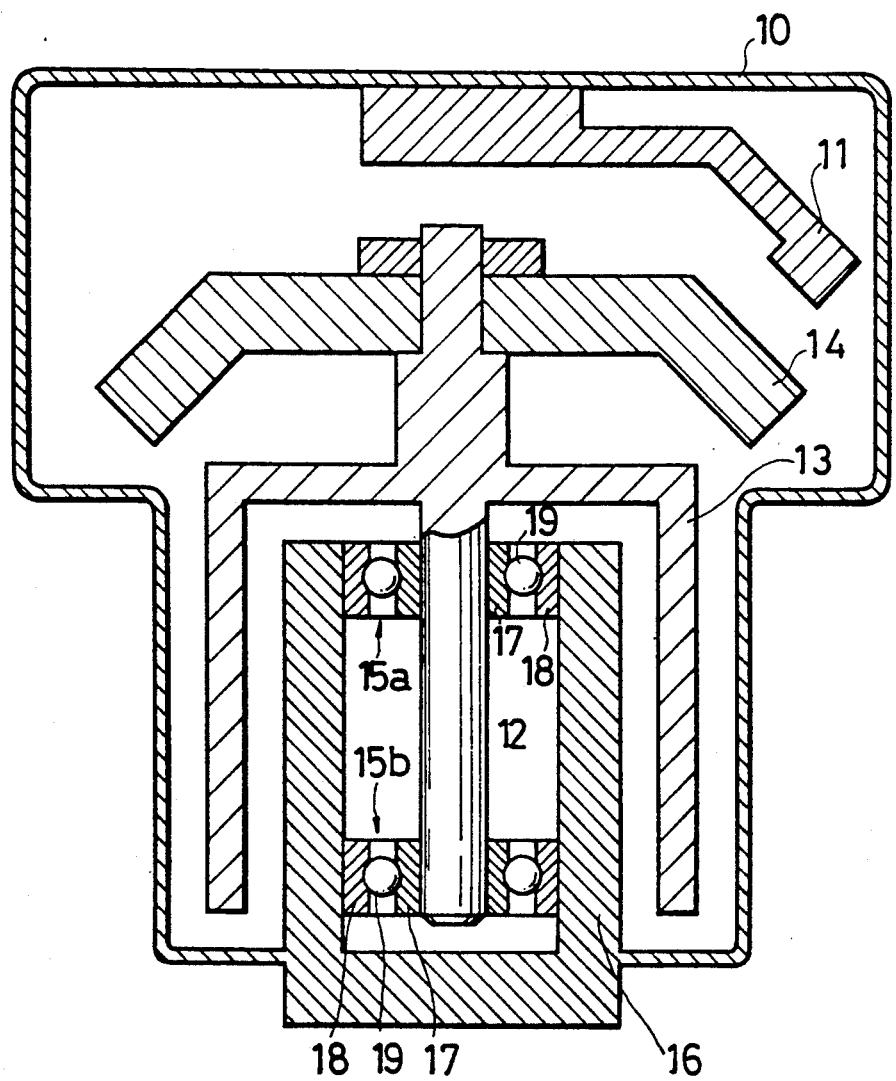
FIG. 2 is a sectional view schematically showing a rotary anode X-ray tube according to a prior art device.
Figure 5:
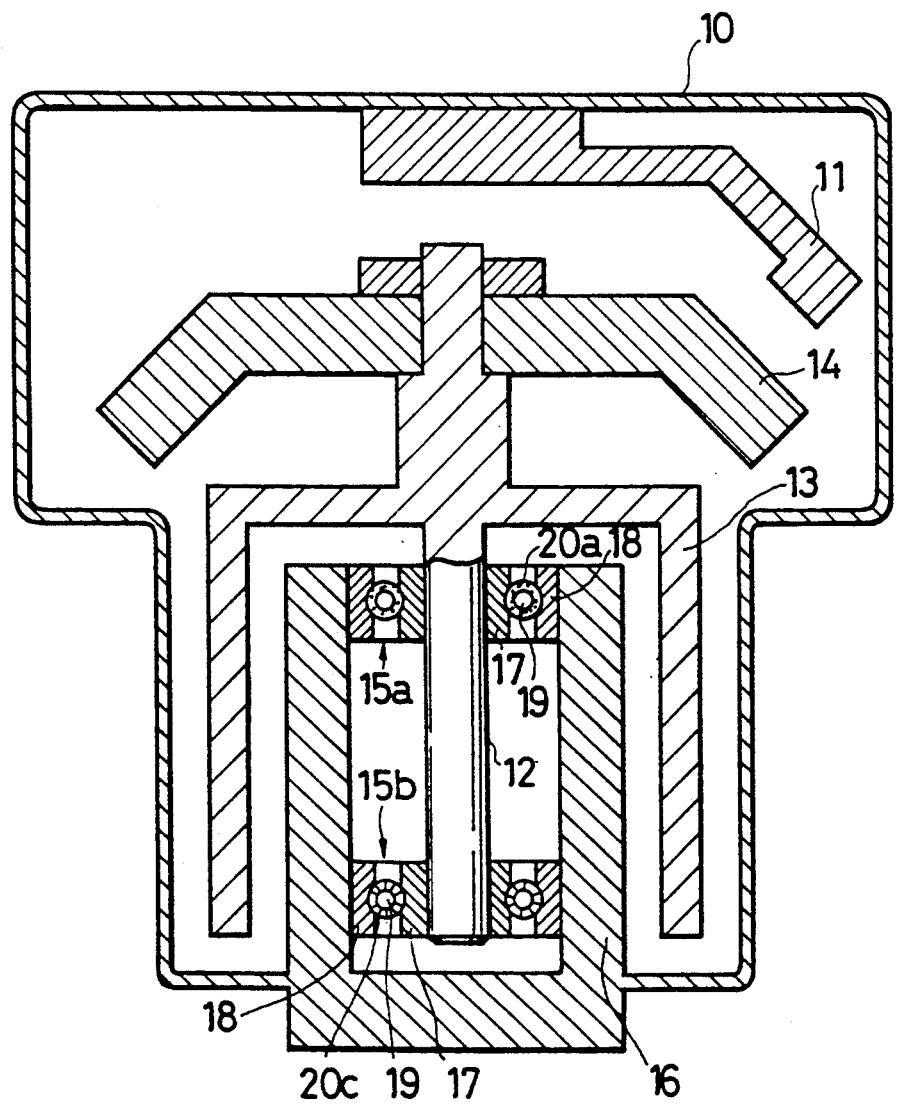
FIG. 5 is a sectional view schematically showing a rotary anode X-ray tube according to the present invention.

FIG. 5 is a sectional view schematically showing a rotary anode X-ray tube according to the present invention. As shown in the figure, a vacuum vessel 10 contains a cathode 11 for emitting electrons, a rotary shaft 12, a rotor 13 fixed to the rotary shaft 12, and an anode target 14 fixed to the rotor 13. The cathode 11 and anode target 14 face each other. The rotary shaft 12 is rotatably supported by a support shaft 16 through two ball bearings 15a and 15b. Each of the ball bearings 15a and 15b comprises an inner race 17, an outer race 18, and a plurality of balls 19 rotatably disposed between the inner and outer races 17 and 18. A magnetic field generator (not shown) is arranged outside the vacuum vessel 10 to generate a rotating magnetic field that rotates the rotor 13, thus rotating the rotary shaft 12 and anode target 14. Such an arrangement is the same as that of the conventional rotary anode X-ray tube shown in FIG. 2.

The inner and outer races 17 and 18 and balls 19 of the ball bearing 15a in the vicinity of the anode target 14 are made of silicon nitride. The inner and outer races 17 and 18 and balls 19 of the ball bearing 15b located opposite to the anode target 14 are made of high speed tool steel (SKH-4). The surface of each ball 19 of the ball bearing 15a is coated with tin film 20a for lubrication, while the surface of each ball 19 of the ball bearing 15b is coated with a lead film 20c for lubrication.

According to the rotary anode X-ray tube of the invention, the cathode 11 emits electrons. The electrons hit the anode target 14 rotating at high speed to generate X-rays. Due to the collision of electrons, the anode target 14 is heated to a high temperature, and, due to heat radiation and heat transmission from the rotary shaft 12, the ball bearings 15a and 15b are also heated to high temperatures.

At this time, the tin film 20a covering the surface of each ball 19 of the ball bearing 15a and the lead film 20c covering the surface of each ball 19 of the ball bearing 15b act as lubricants. Since the ball bearing 15a is closer to the anode target 14 than the ball bearing 15b, the ball bearing 15a is heated more than the ball bearing 15b.

Particularly in a large capacity X-ray tube, a temperature of its bearing will be 400 degrees centigrade or more. As shown in FIG. 3, the tin film 20a on each ball 19 of the ball bearing 15a has a low vapor pressure and a low melting point so that the tin coat 20a is liquidized to provide good lubrication of low friction up to high temperatures without deteriorating the degree of vacuum in the vacuum vessel 10 due to evaporation.

Since the inner an outer races 17 and 18 and balls 19 of the ball bearing 15a are made of silicon nitride, the frictional surfaces of the inner and outer races 17 and 18 and balls 19 of the ball bearing 15a will not be damaged due to corrosion even if the tin 20a is liquidized at high temperatures.

The inner and outer races or rings 17 and 18 and balls 19 of the ball bearing 15b that is located opposite to the anode target 14 are made of high speed tool steel (SKH-4), and the surface of each ball 19 is coated with the lead film 20c. Therefore, a predetermined voltage can be applied to the anode target 14 from the outside through the ball bearing 15b and rotary shaft 12.

Even if the ball bearings 15a and 15b are rotated at high speed at high temperatures with increased electrons colliding with the anode target 14 with increased output, stable lubrication can be maintained.

Although the surfaces of the balls 19 of the ball bearing 15a adjacent to the anode target 14 have been coated each with the tin film 20a in the embodiment, an outer surface of the inner race 17 and an inner surface of the outer race 18 of the ball bearing 15a may be coated with the tin.

Although the surfaces of the balls 19 of the ball bearing 15a have been coated each with the tin film 20a in the embodiment, they may be coated with any one of aluminum and indium. Similar to the tin, the aluminum and indium have low vapor pressures as shown in FIG. 3 compared to the lead that is generally used as a lubricant, so that they do not deteriorate the degree of vacuum due to evaporation at high temperatures. In addition, they have excellent lubricating capacity so that they can maintain lubrication even at high speed rotation.

Since the indium has a low melting point similar to the tin, the indium becomes molten to provide good lubrication with low friction. It is also possible to use gallium having a melting point that is drastically low compared to those of the tin and indium as well as having a low vapor pressure.

As shown in Table 1, the aluminum (Al) is soft metal that has lower tensile strength and larger elongation than the silver (Ag) that is conventionally used as a lubricant. Therefore, due to the reasons mentioned before, the aluminum does not deteriorate the degree of vacuum at high temperatures. In addition, the aluminum has lubricating capacity even in its solid state so that it can maintain lubrication with low friction.

Although the inner and outer rings 17 and 18 and balls 19 of the ball bearing 15a have been made of silicon nitride in the embodiment, they may be formed of any one of silicon carbide, alumina and zirconia having excellent corrosion resistance.

Although the inner and outer races 17 and 18 and balls 19 of the ball bearing 15b have been made of high speed tool steel (SKH-4) and the surface of each ball has been coated with the lead film 20c in the embodiment, the inner and outer races 17 and 18 and balls 19 of the ball bearing 15b may be made of another metal, and the surface of each ball may be coated with solid lubricant such as silver.

Figure 6:
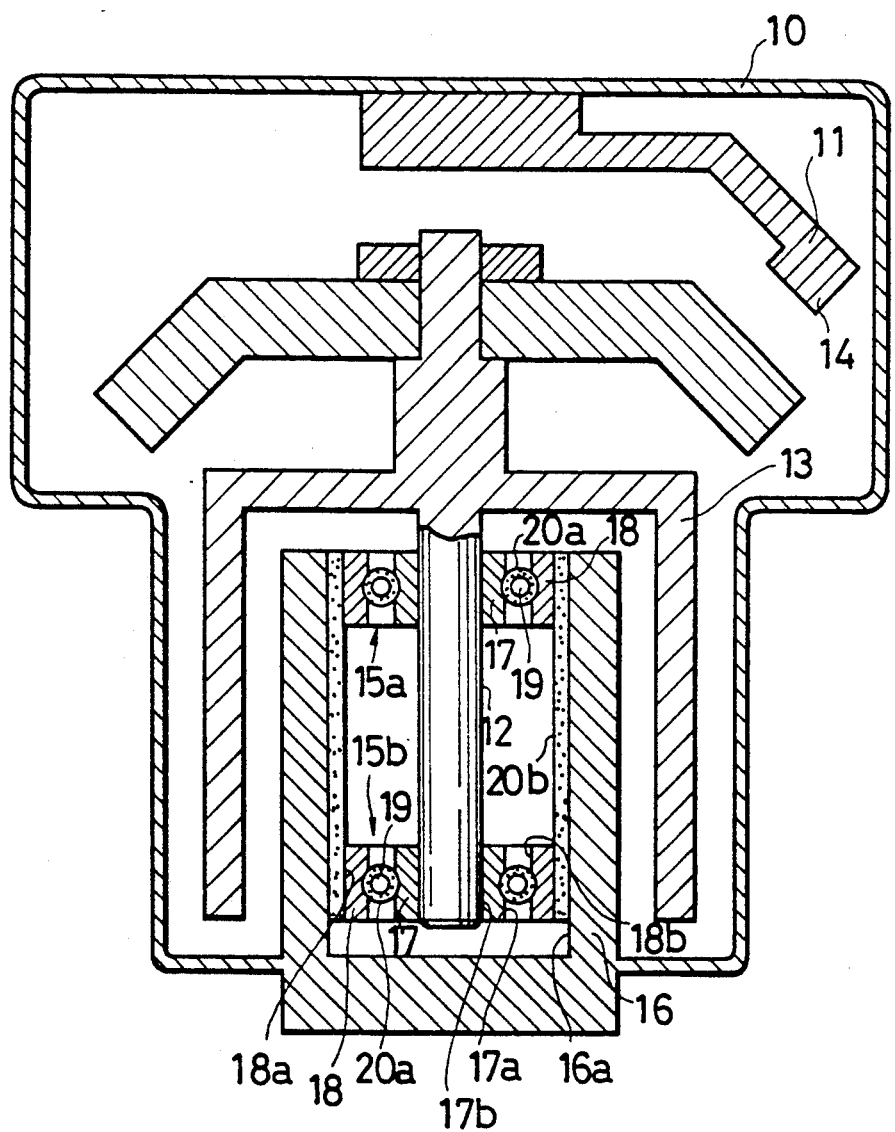
FIG. 6 is a sectional view schematically showing a rotary anode X-ray tube according to another embodiment of the invention.

FIG. 6 is a sectional view schematically showing a rotary anode X-ray tube according to another embodiment of the invention. As shown in the figure, a vacuum vessel 10 contains a cathode 11 for emitting electrons, a rotary shaft 12, a rotor 13 fixed to the rotary shaft 12, and an anode target 14 fixed to the rotor 13. The cathode 11 and anode target 14 face each other. The rotary shaft 12 is rotatably supported by a support shaft 16 through two ball bearings 15a and 15b. Each of the ball bearings 15a and 15b comprises an inner race 17, an outer race 18, and a plurality of balls 19 rotatably disposed between the inner and outer races 17 and 18. A magnetic field generator (not shown) is arranged outside the vacuum vessel 10 to generate a rotating magnetic field that rotates the rotor 13, thereby rotating the rotary shaft 12 and anode target 14. Such an arrangement is the same as that of the rotary anode X-ray tube shown in FIG. 5.

The surface of each ball 19 of the ball bearings 15a and 15b is coated with a tin film 20a for lubrication of frictional surfaces of the inner and outer races 17 and 18 and balls 19. A bearing fitting face 16a of the support shaft 16 is coated with a tin film 20b for lubrication against a sliding motion of an outer face 18a of the outer race 18. Such a sliding motion is caused by axial elongation or contraction of the rotor 13 due to changes in temperature.

The cathode 11 emits electrons. The electrons hit the anode target 14 rotating at high speed and generate X-rays. Due to the collision of electrons, the anode target 14 is heated to a high temperature, and, due to heat radiation and heat transmission from the rotary shaft 12 and support shaft 16, the ball bearings 15a and 15b are also heated to high temperatures.

At this time, the tin films 20a and 20b covering the surfaces of the balls 19 of the ball bearing 15a and bearing fitting face 16a demonstrate good lubrication in solid and liquid states. As shown in FIG. 3, the tin films 20a and 20b have a low melting point and low vapor pressure so that they may be molten at high temperatures but do not deteriorate the degree of vacuum in the vacuum vessel 10 due to evaporation, thus providing good lubrication.

Even if electrons colliding with the anode target 14 are increased to increase an output and to rotate the ball bearings 15a and 15b at higher speed at high temperatures, the tin films 20a and 20b can maintain stable lubrication.

Although the surfaces of the balls 19 and bearing fitting face 16a have been coated with the tin films 20a and 20b in the embodiment, an outer face 17a of the inner race 17 and an inner face 18b of the outer race 18 may be coated with the tin. In addition, an outer face 18a of the outer race 18 may be coated with the tin. Further, the tin may cover a peripheral face of the rotary shaft 12 and an inner face 17b of the inner race 17.

Although the surfaces of the balls 19 of the ball bearings 15a and 15b and bearing fitting face 16a have been coated with the tin films 20a and 20b in the embodiment the surfaces of the balls 29 of the ball bearings 15a and 15b and bearing fitting face 16a of the support shaft 16 may be coated with any one of aluminum and indium to provide the same satisfactory lubrication.

Figure 7:
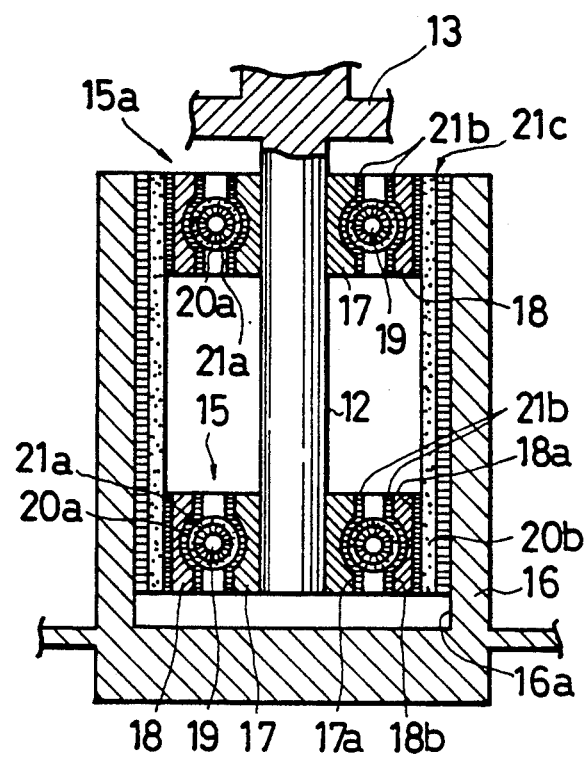
FIGS. 7, 8 and 9 are sectional views schematically showing rotary anode X-ray tubes according to other embodiments of the present invention, respectively.

FIG. 7 is a sectional view showing bearings of a rotary anode X-ray tube according to still another embodiment of the invention.

In this embodiment, the surfaces of each ball 19 of ball bearings 15a and 15b is coated with a molybdenum film 21a that is refractory metal. Then, the surface of the molybdenum film 21a is coated with a tin film 20a. An outer face 17a of an inner race 17 and an inner face 18b of an outer race 18 are coated each with a molybdenum film 21b. Between a bearing fitting face 6a of a support shaft 16 and an outer face 18a of the outer race 18, there are arranged molybdenum films 21c with a tin film 20b between the molybdenum films 21c. Other arrangement of FIG. 7 are the same as that shown in FIG. 5.

The molybdenum films 21a, 21b and 21c covering the tin films 20a and 20b have excellent corrosion resistance so that corrosion due to the tin films 20a and 20b that are molten at high temperatures is prevented.

Although the embodiment has used molybdenum as a refractor metals, other refractory metal such as tungsten may be employed.

Figure 8:
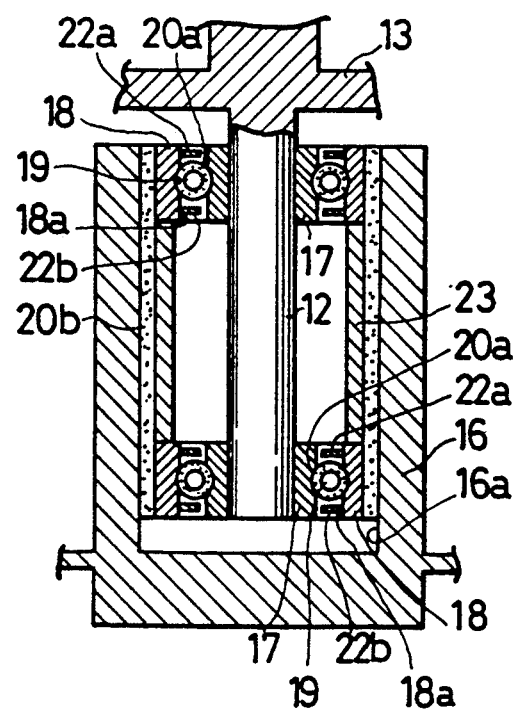

FIG. 8 is a sectional view showing bearings of a rotary anode X-ray tube according to still another embodiment of the invention.

In this embodiment, each ball 19 is coated with a tin film 20a. An inner face 18a of an outer race 18 is provided with shield plates 22a and 22b that are located above and below the balls 19. Between upper and lower outer races 18, a sleeve 23 is arranged to abut against a tin film 20b covering a bearing fitting face 16a of a support shaft 16.

The shield plates 22a and 22b and sleeve 23 of the embodiment prevent the molten tin films 20a and 20b from scattering. Namely, the molten tin films 20a and 20b are prevented from scattering due to the rotation of the ball bearings 15a and 15b and prevented from adhering to a rotor 13, etc., thus preventing the rotation from unbalancing. As a result, an anode target 14 is prevented from vibrating.

Other materials such as indium that will melt may be usable with the above-mentioned arrangement.

Figure 9:
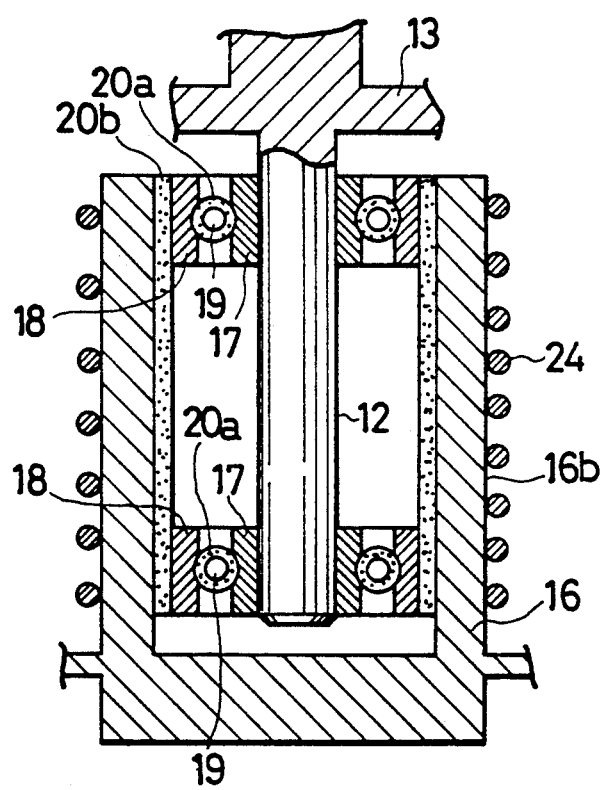

FIG. 9 is a sectional view showing bearings of a rotary anode X-ray tube according to still another embodiment of the invention.

In this embodiment, a heater 24 is disposed as heating means around a peripheral face 16b of a support shaft 16. Other arrangement is the same as that shown in FIG. 6.

The heater 24 is energized to heat tin films 20a and 20b. When the rotary anode X-ray tube is stopped, i.e., not rotating, temperatures of the molten tin films 20a and 20b may decrease to solidify the tin films 20a and 20b. Then, the surfaces covered with the tin films 20a and 20b adhere to the faces opposite to the tin covered faces. As a result, torque needed for restarting the rotary anode X-ray tube shall be large. This disadvantage is solved by the heater 24 that heats the tin coats 20a and 20b to prevent the adhesion of the tin coats 20a and 20b.

The arrangement of this embodiment is effective with the use of other materials such as indium that will melt.

Although the embodiment has used the heater 24 as the heating means, other apparatuses may be used as the heating means if they can heat the tin films 20a and 20b beyond their melting points when the rotary anode X-ray tube is stopped. Positioning of the heating means is not limited to the one shown in FIG. 9.

In the embodiments shown in FIGS. 7 to 9, the surfaces of the balls 19 of the ball bearings 15a and 15b and the bearing fitting face 16a of the support shaft 16 may be covered with any one of aluminum and indium instead of tin, to provide the similar lubrication. The inner and outer races 17 and 18 and balls 19 of the ball bearings 15a and 15b may be formed of any of silicon nitride, silicon carbide, alumina and zirconia.

The ball bearing 3 shown in FIG. 4 may be constituted similar to any one of the embodiments shown in FIGS. 7 to 9 to provide the same effect of the one.

The tin, aluminum and indium may not necessarily be used individually. For example, tin and 1% to 10% of lead may be mixed to improve lubricating capacity, because lead is softer than tin alone. Even if all the lead evaporates, the degree of vacuum will not be deteriorated because an amount of the lead is very small and the remaining tin can maintain sufficient lubrication.

Aluminum and indium may also be mixed with other materials. The materials to be mixed are not limited to the lead. For example, tin, aluminum land indium may be mixed with each other.

As described in the above, by using lubricant that demonstrates low vapor pressure at high temperatures (about 350 degrees centigrade or over), excellent lubrication can be achieved under the conditions of high temperature and vacuum.

The bearings according to the present invention can maintain stable lubrication under the conditions of high temperature and vacuum and their service lives are long.

The rotary anode X-ray tube of the invention adopting such bearings of the invention maintains good lubrication even if its output is increased and has extended service life.

Various modifications will become possible for those skilled in the art after receiving the teachings of the present disclosure without departing from the scope thereof.

What is claimed is:

1. A rotary anode X-ray tube, comprising a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subjected to friction due to the rotation of said shaft and a lubricant coating applied to said frictional surface to reduce the friction, wherein said lubricant coating takes its liquid state while said shaft is rotating at temperatures of about 200° C. and said frictional surface is composed of a material capable of resisting a chemical action of said lubricant, wherein said lubricant coating is made from tin and said frictional surface is made from a ceramic capable of resisting the chemical action of tin, wherein said ceramic is one of silicon nitride, silicon carbide, alumina and zirconia.

2. A rotary anode X-ray tube, comprising a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subjected to friction due to the rotation of said shaft and a lubricant coating applied to said frictional surface to reduce the friction, wherein said lubricant coating takes its liquid state while said shaft is rotating at temperatures of about 200° C. and said frictional surface is composed of a material capable of resisting a chemical action of said lubricant, further comprising a shield disposed in the vicinity of said frictional surface in order to prevent splash of said lubricant coating.

3. A hearing for supporting a rotating shaft comprising:
   a frictional surface subjected to friction due to the rotation of said shaft; and
   a lubricant coating comprising tin and applied to said frictional surface to reduce the friction;
   wherein said frictional surface is made from a ceramic capable of resisting the chemical action of tin.

4. The bearing of claim 3, wherein said frictional surface comprises a ball bearing in contact with a race, and wherein the surfaces of both said ball bearing and said race are composed of said ceramic material.

5. A rotary anode X-ray tube comprising:
   a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subjected to friction due to the rotation of said shaft and a lubricant coating applied to said frictional surface to reduce the friction, wherein said frictional surface is made from a ceramic capable of resisting the chemical action of tin.

6. The X-ray tube of claim 5, wherein said frictional surface comprises a ball bearing in contact with a race, and wherein the surfaces of both said ball bearing and said race are composed of said ceramic material.

7. A bearing for supporting a rotating shaft comprising:
   a frictional surface subjected to friction due to the rotation of said shaft;
   a lubricant coating applied to said frictional surface to reduce the friction; and
   wherein said lubricant coating is made from aluminum and said frictional surface is composed of a ceramic capable of resisting a chemical action of said lubricant.

8. A rotary anode X-ray tube, comprising a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subject to friction due to the rotation to said shaft and a lubricant coating applied to said frictional surface to reduce the friction, wherein said lubricant coating is made from aluminum and said frictional surface is composed of a material capable of resisting a chemical action of said lubricant, wherein said frictional surface is made from a ceramic capable of resisting a chemical action of said lubricant.

9. A bearing for supporting a rotating shaft comprising:
   a frictional surface subjected to friction due to the rotation of said shaft;
   a lubricant coating applied to said frictional surface to reduce the friction; and
   a shield disposed in the vicinity of said frictional surface, in order to prevent splash of said lubricant coating,
   wherein said lubricant coating is made from tin.

10. A rotary anode X-ray tube comprising a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subjected to friction due to the rotation of said shaft, a lubricant coating applied to said frictional surface to reduce the friction, and a shield disposed in the vicinity of said frictional surface in order to prevent splash of said lubricant coating, wherein said lubricant coating is made from tin.

11. A bearing for supporting a rotating shaft, comprising:
    a frictional surface subjected to friction due to the rotation of said shaft; and
    a lubricant coating applied to said frictional surface to reduce the friction;
    wherein said lubricant coating takes its liquid state while said shaft is rotating at temperature of about 200° C., and further comprising a shield disposed in the vicinity of said frictional surface in order to prevent splash of said lubricant coating.

12. A rotary anode X-ray tube, comprising a cathode for emitting electrons in a vacuum vessel, an anode target with which the electrons emitted from the cathode collide to generate X-rays, a rotor fixed integrally with the anode target, and a bearing for rotatably supporting the anode target, said bearing comprising a frictional surface subjected to friction due to the rotation of said shaft and a lubricant coating applied to said frictional surface to reduce the friction, wherein said lubricant coating takes its liquid state while said shaft is rotating at temperatures of about 200° C., and further comprising a shield disposed in the vicinity of said frictional surface in order to prevent splash of said lubricant coating.

13. A bearing for supporting a rotating shaft, comprising:
a frictional surface subjected to friction due to the rotation of said shaft; and
a lubricant coating applied to said frictional surface to reduce the friction;
wherein said lubricant coating is made from indium, and further comprising a shield disposed in the vicinity of said frictional surface in order to prevent splash of said lubricant coating.

14. A rotary anode X-ray tube, comprising:
a cathode for emitting electrons in a vacuum vessel, an anode target with which the electrons emitted form the cathode collide to generate X-rays, a rotor fixed integrally with the anode target, and a bearing for rotatably supporting the anode target, said bearing comprising a frictional surface subjected to friction due to the rotation of said shaft and a lubricant coating applied to said frictional surface to reduce the friction, wherein said lubricant coating is made from indium, and further comprising a shield disposed in the vicinity of said frictional surface in order to prevent splash of said lubricant coating.

15. A bearing for supporting a rotating shaft, comprising:
a frictional surface subjected to friction due to the rotation of said shaft; and
a lubricant coating applied to said frictional surface to reduce the friction;
wherein said lubricant coating is made from gallium; and
further comprising a shield disposed in the vicinity of said frictional surface in order to prevent splash of said lubricant coating.

16. A bearing for supporting a rotating shaft, comprising:
a frictional surface subjected to friction due to the rotation of said shaft;
a lubricant coating applied to said frictional surface to reduce the friction; and
wherein said lubricant coating is made from aluminum and said frictional surface is composed of a material capable of resisting a chemical action of said lubricant; and
further comprising a shield disposed in the vicinity of said frictional surface in order to prevent splash of said lubricant coating.

17. A bearing for supporting a rotating shaft, comprising:
a frictional surface subjected to friction due to the rotation of said shaft; and
a lubricant coating applied to said frictional surface to reduce the friction;
wherein said lubricant coating takes its liquid state while said shaft is rotating at temperatures of about 650° C.; and
further comprising a shield disposed in the vicinity of said frictional surface in order to prevent splash of said lubricant coating.

18. A bearing for supporting a rotating shaft, comprising:
a frictional surface subjected to friction due to the rotation of said shaft; and
a lubricant coating applied to said frictional surface to reduce the friction;
wherein said lubricant coating is made from indium; and
wherein said frictional surface is made from a ceramic capable of resisting a chemical action of said lubricant coating.

19. A bearing for supporting a rotating shaft, comprising:
a frictional surface subjected to friction due to the rotation of said shaft; and
a lubricant coating applied to said frictional surface to reduce the friction;
wherein said lubricant coating takes its liquid state while said shaft is rotating at temperatures of about 200° C.;
wherein said frictional surface is made from a ceramic capable of resisting a chemical action of said lubricant coating.

20. A bearing for supporting a rotating shaft, comprising:
a frictional surface subjected to friction due to the rotation of said shaft; and
a lubricant coating applied to said frictional surface to reduce the friction;
wherein said frictional surface is made from gallium; and
wherein said frictional surface is made form a ceramic capable of resisting a chemical action of said lubricant coating.

21. A bearing for supporting a rotating shaft, comprising:
a frictional surface subjected to friction due to the rotation of said shaft; and
a lubricant coating applied to said frictional surface to reduce the friction;
wherein said lubricant coating takes its liquid state while said shaft is rotating at temperatures of about 650° C.; and
wherein said frictional surface is made from a ceramic capable of resisting the chemical action of said lubricant coating.

22. A bearing for supporting a rotating shaft, comprising:
a frictional surface subjected to friction due to the rotation of said shaft; and
a lubricant coating applied to said frictional surface to reduce the friction;
wherein said lubricant coating is made from tin and said frictional surface is composed of a material capable of resisting a chemical action of said lubricant; and
further comprising a shield disposed in the vicinity of said frictional surface in order to prevent splash of said lubricant coating.

23. A bearing for supporting a rotating shaft, comprising:
a frictional surface subjected to friction due to the rotation of said shaft; and
a lubricant coating applied to said frictional surface to reduce the friction;
wherein said lubricant coating is made form indium;
wherein said frictional surface is composed of a material capable of resisting a chemical action of said lubricant; and
further comprising a shield disposed in the vicinity of said frictional surface in order to prevent splash of said lubricant coating.

24. A bearing for supporting a rotation shaft, comprising:
a frictional surface subjected to friction due to the rotation of said shaft; and a lubricant coating applied to said frictional surface to reduce the friction;

wherein said lubricant coating takes its liquid state while said shaft is rotating at temperatures of about 200° C. and said frictional surface is composed of a material capable of resisting a chemical action of said lubricant; and further comprising a shield disposed in the vicinity of said frictional surface in order to prevent splash of said lubricant coating.

25. A bearing for supporting a rotating shaft, comprising:

a frictional surface subjected to friction due to the rotation of said shaft; and a lubricant coating applied to said frictional surface to reduce the friction;

wherein said lubricant coating is made from gallium;

wherein said frictional surface is composed of a material capable of resisting a chemical action of said lubricant; and further comprising a shield disposed in the vicinity of said frictional surface in order to prevent splash of said lubricant coating.

26. A bearing for supporting a rotating shaft, comprising:

a frictional surface subjected to friction due to the rotation of said shaft; and a lubricant coating applied to said frictional surface to reduce the friction;

wherein said lubricant coating is made from aluminum and said frictional surface is composed of a material capable of resisting a chemical action of said lubricant; and further comprising a shield disposed in the vicinity of said frictional surface in order to prevent splash of said lubricant coating.

27. A bearing for supporting a rotating shaft, comprising:

a frictional surface subjected to friction due to the rotation of said shaft; and a lubricant coating applied to said frictional surface to reduce the friction;

wherein said lubricant coating takes its liquid state while said shaft is rotating at temperatures of about 650° C.;

wherein said frictional surface is composed of a material capable of resisting a chemical action of said lubricant, and further comprising a shield disposed in the vicinity of said frictional surface in order to prevent splash of said lubricant coating.

28. A bearing for supporting a rotating shaft, comprising:

a frictional surface subjected to friction due to the rotation of said shaft; and a lubricant coating applied to said frictional surface to reduce the friction;

wherein said lubricant coating is made from indium;

wherein said frictional surface is made from a ceramic capable of resisting the chemical action of said lubricant coating; and wherein said ceramic is one of silicon nitride, silicon carbide, alumina, and zirconia.

29. A bearing for supporting a rotating shaft, comprising:

a frictional surface subjected to friction due to the rotation of said shaft; and a lubricant coating applied to said frictional surface to reduce the friction;

wherein said lubricant coating takes its liquid state while said shaft is rotating at temperatures of about 200° C.;

wherein said frictional surface is made from a ceramic capable of resisting the chemical action of said lubricant coating; and wherein said ceramic is one of silicon nitride, silicon carbide, alumina and zirconia.

30. A bearing for supporting a rotating shaft, comprising:

a frictional surface subjected to friction due to the rotation of said shaft; and a lubricant coating applied to said frictional surface to reduce the friction;

wherein said lubricant coating is made from gallium;

wherein said frictional surface is made from a ceramic capable of resisting the chemical action of said lubricant coating; and wherein said ceramic is one of silicon nitride, silicon carbide, alumina and zirconia.

31. A bearing for supporting a rotating shaft, comprising:

a frictional surface subjected to friction due to the rotation of said shaft;

a lubricant coating applied to said frictional surface to reduce the friction; and wherein said lubricant coating is made from aluminum and said frictional surface is composed of a material capable of resisting a chemical action of said lubricant;

wherein said frictional surface is made from a ceramic capable of resisting the chemical action of said lubricant coating; and wherein said ceramic is one of silicon nitride, silicon carbide, alumina and zirconia.

32. A bearing for supporting a rotating shaft, comprising:

a frictional surface subjected to friction due to the rotation of said shaft;

and a lubricant coating applied to said frictional surface to reduce the friction;

wherein said lubricant coating takes its liquid state while said shaft is rotating at temperatures of about 650° C.;

wherein said frictional surface is made from a ceramic capable of resisting the chemical action of said lubricant coating; and wherein said ceramic is one of silicon nitride, silicon carbide, alumina and zirconia.

33. A bearing for supporting a rotating shaft, comprising:

a frictional surface subjected to friction due to the rotation of said shaft; and a lubricant coating applied to said frictional surface to reduce the friction;

wherein said lubricant coating is made from indium;

wherein said frictional surface is composed of a material capable of resisting a chemical action of said lubricant; and further comprising a shield disposed in the vicinity of said frictional surface in order to prevent splash of said lubricant coating.

34. A bearing for supporting a rotating shaft, comprising:

a friction surface subjected to friction due to the rotation of said shaft; and a lubricant coating applied to said frictional surface to reduce the friction;

wherein said lubricant coating takes its liquid state while said shaft is rotating at temperatures of about 200° C.;

wherein said frictional surface is composed of a material capable of resisting a chemical action of said lubricant; and further comprising a shield disposed in the vicinity of said frictional surface in order to prevent splash of said lubricant coating.

35. A bearing for supporting a rotating shaft, comprising:

a friction surface subjected to friction due to the rotation of said shaft; and a lubricant coating applied to said frictional surface to reduce the friction;

wherein said lubricant coating is made from gallium;

wherein said frictional surface is composed of a material capable of resisting a chemical action of said lubricant; and further comprising a shield disposed in the vicinity of said frictional surface in order to prevent splash of said lubricant coating.

36. A bearing for supporting a rotating shaft, comprising:

a frictional surface subjected to friction due to the rotation of said shaft; and a lubricant coating applied to said frictional surface to reduce the friction;

wherein said lubricant coating is made from aluminum and said frictional surface is composed of a material capable of resisting a chemical action of said lubricant; and further comprising a shield disposed in the vicinity of said frictional surface in order to prevent splash of said lubricant coating.

37. A bearing for supporting a rotating shaft, comprising:

a frictional surface subjected to friction due to the rotation of said shaft; and a lubricant coating applied to said frictional surface to reduce the friction;

wherein said lubricant coating takes its liquid state while said shaft is rotating at temperatures of about 650° C.;

wherein said frictional surface is composed of a material capable of resisting a chemical action of said lubricant; and further comprising a shield disposed in the vicinity of said frictional surface in order to prevent splash of said lubricant coating.

38. A bearing for supporting a rotating shaft, comprising:

a frictional surface subjected to friction due to the rotation of said shaft; and a lubricant coating applied to said frictional surface to reduce the friction;

wherein said lubricant coating is made from indium;

wherein said frictional surface is made from a ceramic capable of resisting the chemical action of said lubricant coating; and wherein said frictional surface comprises a ball bearing in contact with a race, and wherein the surfaces of both said ball bearing and said race are composed of said ceramic material.

39. A bearing for supporting a rotating shaft, comprising:

a frictional surface subjected to friction due to the rotation of said shaft; and a lubricant coating applied to said frictional surface to reduce the friction;

wherein said lubricant coating takes its liquid state while said shaft is rotating at temperatures of about 200° C.;

wherein said frictional surface is made from a ceramic capable of resisting the chemical action of said lubricating coating; and wherein said frictional surface comprises a ball bearing in contact with a race, and wherein the surfaces of both said ball bearing and said race are composed of said ceramic material.

40. A bearing for supporting a rotating shaft, comprising:

a frictional surface subjected to friction due to the rotation of said shaft; and a lubricant coating applied to said frictional surface to reduce the friction;

wherein said lubricant coating is made from gallium;

wherein said frictional surface is made from a ceramic capable of resisting the chemical action of said lubricant coating; and wherein said frictional surface comprises a ball bearing in contact with a race, and wherein the surfaces of both said ball bearing and said race are composed of said ceramic material.

41. A bearing for supporting a rotating shaft, comprising:

a frictional surface subjected to friction due to the rotation of said shaft;

a lubricant coating applied to said frictional surface to reduce the friction; and a lubricant coating applied to said frictional surface to reduce the friction;

wherein said lubricant coating is made from aluminum;

wherein said frictional surface is made from a ceramic capable of resisting the chemical action of said lubricant coating; and wherein said frictional surface comprises a ball bearing in contact with a race, and wherein the surface of both said ball bearing and said race are composed of said ceramic material.

42. A bearing for supporting a rotating shaft, comprising:

a frictional surface subjected to friction due to the rotation of said shaft; and a lubricant coating applied to said frictional surface to reduce the friction;

wherein said lubricant coating takes its liquid state while said shaft is rotating at temperatures of about 650° C.;

wherein said frictional surface is made from a ceramic capable of resisting the chemical action of said lubricant coating; and wherein said frictional surface comprises a ball bearing in contact with a race, and wherein the surfaces of both said ball bearing and said race are composed of said ceramic material.

* * * * *